H. FRANK.
Metallurgic Gas-Furnaces.
No. 135,639. Patented Feb. 11, 1873.
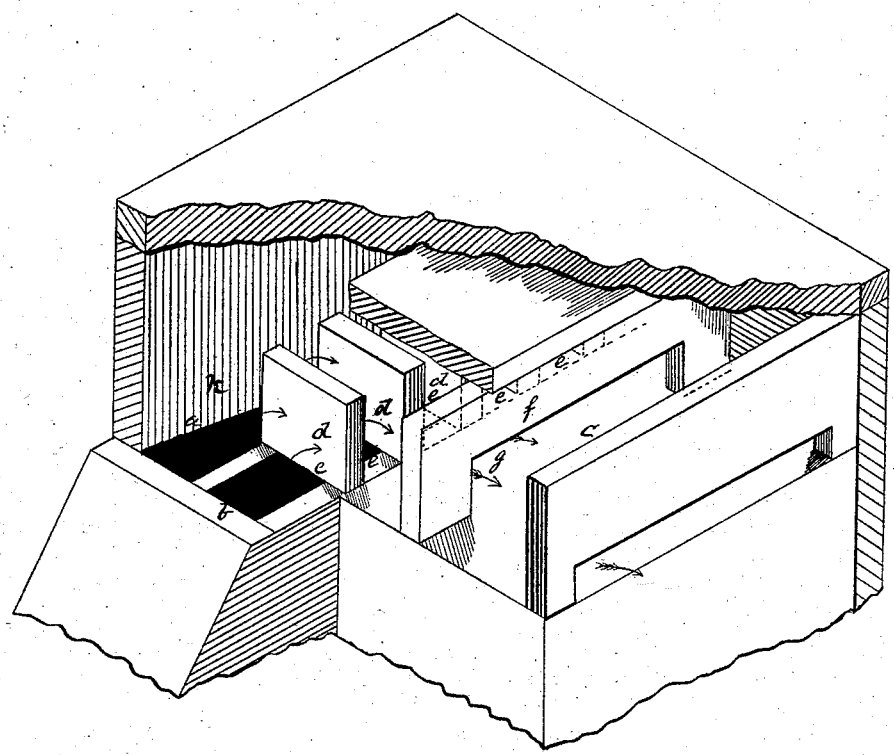

UNITED STATES PATENT OFFICE.

HIMAN FRANK, OF PITTSBURG, PENNSYLVANIA.

IMPROVEMENT IN METALLURGIC GAS-FURNACES.

Specification forming part of Letters Patent No. 135,639, dated February 11, 1873.

*To all whom it may concern:*

Be it known that I, HIMAN FRANK, of Pittsburg, in the county of Allegheny and State of Pennsylvania, have invented a new and useful Improvement in Furnaces; and I do hereby declare the following to be a full, clear, and exact description thereof, reference being had to the accompanying drawing forming a part of this specification, which represents, in perspective, the bed of a heating-furnace embodying my improvements, the roof of the same being broken away for purposes of illustration.

In gas-furnaces the gas and air, which form the elements of combustion, are brought to the mouth of the combustion chamber or bed in separate flues, and are there united or commingled by flowing into each other. It is a matter of some difficulty to intermix them thoroughly. When this is not done a portion of the air or gas remains unchanged and passes off through the neck of the furnace, detracting from the heat in the chamber, more or less, in proportion to the amount unconsumed; hence it is desirable to construct the furnace and its entrance-flues in the manner which will secure the most intimate and thorough admixture of the air and gas.

The object of my invention is to arrange the air and gas flues in such a manner that they shall not discharge their respective currents directly into the furnace-bed, but into an intermediate flue leading to the bed, which intermediate flue is subdivided by tile in the manner hereinafter described, so as to form a number of passages, through which the air and gas pass on their way to the furnace. The result of this construction is a very intimate admixture of the air and gas before they enter the combustion-chamber. This is further aided by the peculiar construction of the bridge, which also forms a portion of my invention.

To enable others skilled in the art to make and use my invention, I will describe its construction and mode of operation.

In the drawing, $a$ represents the air-flue, and $b$ the gas-flue, which lead up into the bed $c$. Placed transversely across the mouth of the flue $b$, at stated intervals, is a series of tile, $d$ $d$, which divide the entrance-flue K to the bed $c$ into a number of small passages, $e$ $e$. A little in advance of the opening $e$ $e$ is a bridge, $f$, having a reduced opening, $g$, which forms the entrance to the bed $c$. The object of the tile $d$ $d$ is to divide the inflowing air and gas into numerous small currents for the purpose of causing their more intimate intermixture; and the object of the bridge $f$ with the reduced opening $g$ is to draw the currents into one current again for the same purpose. The bridge $f$ is removable through openings in the sides of the furnace, so as to facilitate repairs.

By this construction I am enabled to produce the most intimate admixture of the air and gas, and thereby secure a much higher degree of heat.

What I claim as my invention, and desire to secure by Letters Patent, is—

1. The tile $d$ $d$, placed in the mouth of the furnace for the purpose of dividing the inflowing volume of gas and air into a number of smaller currents, for the purpose of causing their more intimate admixture prior to their entrance into the combustion chamber or bed, substantially as described.

2. The fire-bridge $f$, having a contracted or reduced opening, $g$, in combination with the tile $d$ $d$, for the purpose of causing the more intimate admixture of the inflowing air and gas, substantially as described.

3. The fire-bridge $f$, made removable, substantially as and for the purposes described.

In testimony whereof I, the said HIMAN FRANK, have hereunto set my hand.

HIMAN FRANK.

Witnesses:
   A. S. NICHOLSON,
   THOS. B. KERR.